(12) United States Patent
Lanza

(10) Patent No.: US 6,291,584 B1
(45) Date of Patent: Sep. 18, 2001

(54) PRODUCTION OF HAZE-FREE BLOCK COPOLYMERS

(75) Inventor: Emmanuel Lanza, Waterloo (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/591,234

(22) Filed: Jun. 8, 2000

(30) Foreign Application Priority Data

Jun. 10, 1999 (BE) .................................................. 99111317

(51) Int. Cl.$^7$ ........................... C08F 297/04; C08L 53/02
(52) U.S. Cl. ........................... 525/98; 525/194; 525/250; 525/271
(58) Field of Search .............................. 525/98, 250, 271, 525/194

(56) References Cited

U.S. PATENT DOCUMENTS 5,545,690 * 8/1996 Trepka et al. .......................... 525/98

* cited by examiner

Primary Examiner—Nathan M. Nutter
Assistant Examiner—Olga Asinovsky
(74) Attorney, Agent, or Firm—Jim D. Wheelington

(57) ABSTRACT

A process for reducing the water take up of a vinyl aromatic-conjugated diene polymer when subjected to a humid environment, the process comprising solution polymerising at least one vinyl aromatic hydrocarbon and a conjugated diene in the presence of a catalyst based on an alkali metal to produce alkalimetal derivatives of a vinyl aromatic-conjugated diene polymer and neutralising the derivatives with a $C_9$–$C_{16}$ alkyl dicarboxylic acid.

19 Claims, 9 Drawing Sheets

PRODUCTION OF HAZE-FREE BLOCK COPOLYMERS

BACKGROUND TO THE INVENTION

The present invention relates to the production of haze-free block copolymers, in particular block copolymers of at least one hydrocarbon conjugated diene, such as butadiene, and at least one monovinylarene, such as styrene, prepared via anionic polymerisation using an alkali metal initiator.

DESCRIPTION OF THE PRIOR ART

It is well known in the art to decolorise polymers of the vinyl aromatic-conjugated diene block copolymer type by using a mineral acid or a mono- or polycarboxylic acid to avoid the deep yellowish colour generated during polymerisation and processing. This treatment results in transparent but yellowish polymers. It is important for the polymer appearance, and particularly for the use of the polymers with foodstuffs, to make this yellowish coloration disappear and to obtain totally transparent, haze-free and colourless copolymers. A number of methods are known for obtaining such transparent, haze-free colourless copolymers by treating solutions of such copolymers with a decolorising agent.

It is known in the art that vinyl aromatic-conjugated diene block copolymers, such as styrene-butadiene-styrene (SBS) block copolymers, may be prepared by anionic polymerisation employing an alkali metal initiator. In such a process, alkali metal derivatives, primarily alkali metal alcoholates, are required to be neutralised prior to recovery of the polymer with an acid capable of converting those derivatives into neutral and inert alkali metal salts of the corresponding acids. Typically the alkali metal employed is lithium and a typical reaction scheme is as follows:

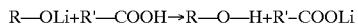

where R is a polymer, typically an SBS block copolymer, a styrene butadiene rubber, a butadiene rubber or a polybutadiene, and R' is a saturated aliphatic group.

If such an acidification step is not carried out, the alkali metal species may generate, among others, the following disadvantageous reactions, producing highly adverse properties in the resultant block copolymer:

- reaction with phenolic moieties present in an antioxidant system provided for protecting the block copolymers against thermoxidative attack, which would otherwise promote the formation of strongly coloured by-products. Such reactions by such alkali metal species therefore would decrease or suppress the resistance to thermoxidative attack of the transparent colourless block copolymers;
- reaction with ester (R—O—COR') groups of some antioxidants, leading to chain cleavage and producing volatile residues;
- reaction with the functional groups of fillers, pigments, colorants, and ultraviolet-protecting additives, thereby reducing their efficiency.

EP-A-0084795 and its corresponding U.S. Pat. No. 4,403,074 disclose the production of clear, haze-free, colourless impact-resistant resinous copolymers, in particular SBS block copolymers, in which alkaline lithium derivatives comprising the coupled polymer-lithium entity, are terminated with water and linear saturated aliphatic dicarboxylic acids selected from $C_2$, $C_3$ and $C_5$–$C_{16}$ acids. While it is disclosed in those documents that the use of such a wide range of linear saturated aliphatic dicarboxylic acids produces haze-free polymers, the process disclosed in those prior specifications can produce polymers which suffer significant reduction in transparency and significant increase in haze when the polymer is subjected to a humid environment.

U.S. Pat. No. 4,877,863 discloses the production of vinyl aromatic-conjugated diene copolymers in which the copolymers are decolorised by treating the copolymer with a thiocarboxylic acid which may be a monoacid or a diacid. The use of such thiocarboxylic acids as disclosed in that document can also lead to degradation in the transparency and haze of the polymer when the polymer is subjected to a high humidity environment It is also known to employ carbon dioxide or propionic acid as a decolorising agent to neutralise the alkaline lithium residues. The use of carbon dioxide or propionic acid also leads to such polymers degrading with regard to their transparency and haze-free properties when the polymers are required to withstand a highly humid environment.

SUMMARY OF THE INVENTION

It is an aim of the present invention to provide for the production of transparent, haze-free, colourless block copolymers having an enhanced resistance to degradation of the optical properties, in particular the transparency and haze-free properties, when the polymers are subjected to a highly humid environment.

Accordingly, the present invention provides the use of an alkyl dicarboxylic acid having $C_9$ to $C_{16}$ in the neutralisation of alkali metal derivatives of a vinyl aromatic-conjugated diene polymer for reducing the water take up of the polymer when subjected to a humid environment.

The present invention further provides a process for producing a vinyl aromatic-conjugated diene block copolymer, the process comprising solution polymerising at least one vinyl aromatic hydrocarbon and a conjugated diene in the presence of a catalyst based on an alkali metal to produce copolymer chains and treating the copolymer chains in solution with an alkyl dicarboxylic acid, whereby for enhancing the resistance of the copolymers to degradation in transparency and haze in a humid environment, the dicarboxylic acid has from 9 to 16 carbon atoms.

The dicarboxylic acid is preferably a $C_9$ to $C_{12}$ linear dicarboxylic acid and more preferably comprises azelaic acid, sebacic acid or dodecanoic acid.

The present invention is predicated on the surprising finding by the present inventors that although for obtaining decolorisation of polymers of the vinyl aromatic-conjugated diene type, many acidification techniques have been described and employed commercially, and most of then essentially permit or disclose the manufacture of transparent, haze-free and colour-free block copolymers, when such polymers are required to withstand a highly humid environment, and even when required to be immersed in cold water or hot water, the initial transparency and haze-free property may be rapidly lost. The degradation of these optical properties is generally a function of the treatment time. The degradation phenomenon, which has not been recognised in EP-A-0084975, U.S. Pat. No. 4,403,074 or U.S. Pat. No. 4,877,863, accordingly destroys the technical advantage of such block copolymers, particularly SBS block copolymers, with respect to high transparency and low haze. Such SBS block copolymers have at least some transparency and a haze-free property for styrene contents of from 15 to 95 wt %, and are regarded as fully transparent at styrene contents of at least 70 wt %. Such optical properties are required when such polymers are for use in applications such as blister-packaging, the manufacture of food-contacting containers, toys, trays, cups, etc.

Without being bound by theory, it is believed by the inventors that the increase in haze of the copolymer as a result of being subjected to a highly humid environment, leading to an increase in opacity and a decrease in transparency, develops within the polymer matrix because of water migration into the material. In addition, high levels of absorbed and occluded water in the polymer leads to surface and appearance defects of extruded or moulded items formed from the block copolymers, which requires costly and time-consuming polymer drying operations in the manufacturing process.

The prior art referred to hereinabove does not recognise the technical problem of a reduction in transparency and an increase in haze as a result of the block copolymers being subjected to particular environments, in particularly highly humid environments. The present inventors have discovered surprisingly that the selection of a particular class of decolorising agents permits not only transparent haze-free vinyl aromatic-conjugated diene block copolymers to be produced, but also the properties of those polymers to be maintained even in highly humid environments. These decolourising agents comprise $C_9$ to $C_{16}$, preferably $C_9$ to $C_{12}$, dicarboxylic acids. Below $C_9$ the improvement with regard to water take-up and transparency is not significant. Above $C_{16}$ the agents are not effective decolourising agents because of the long chain length of the agent.

It is necessary for SBS copolymers for a variety of applications not only to have low haze and high transparency initially, but also to maintain high transparency and low haze when the item produced from the SBS block copolymer is contacted with cold or hot water, or water vapour. For example, the SBS block copolymer may be employed to produce medical items, which are often required to be sterilised in steam, or for food packaging, when hot moist food is often deposited into a container. For food or drinks packaging, the SBS block copolymer may be required to be subjected to sterilisation by pasteurisation by immersion in an aqueous medium at elevated temperature for an extended period, for example 85° C. for 45 minutes. The SBS block copolymer may also be used as a heat shrinkable film where the film is shrunk by being subjected to a steam environment. Such heat shrinkable films are used, for example, for labelling and tamper-evident protection.

The vinyl aromatic-conjugated diene block copolymers produced in accordance with the invention can be either processed as pure polymers or may be blended with other polymers, such as for example polystyrene, known in the art as general purpose polystyrene (GPPS, also known as Cristal PS), to manufacture various articles, for example extruded sheets which may be submitted to a forming process, in particular a thermoforming process, in order to produce transparent, shock-resistant items such as packaging for food.

BRIEF DESCRIPTION OF THE DRAWINGS

Embodiments of the present invention will now be described, by way of example only, with reference to the following drawings, in which.

DETAILED DESCRIPTION OF THE PREFERRED EMBODIMENTS

Figure 1:
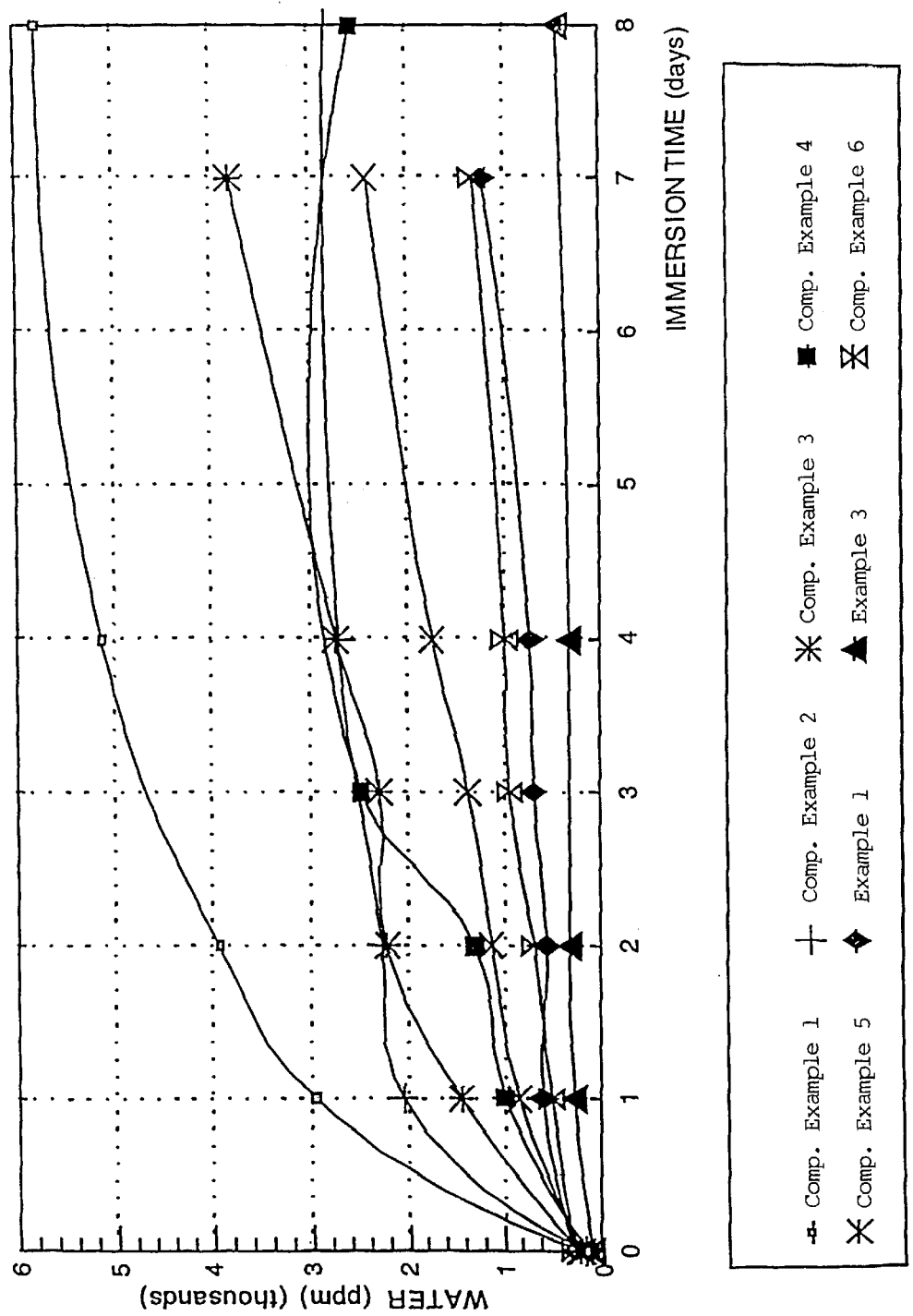
FIG. 1 shows the relationship between water take up and immersion time for SBS copolymer sheets produced in accordance with Examples of the invention and Comparative Examples.

The process of the present invention is applicable to copolymers of the resinous kind and to those of the elastomeric kind which are prepared by the polymerisation in solution of vinyl aromatic and conjugated diene monomers in the presence of initiators of the kind including alkali metals. Polymerisation occurs in such a way as to form a block copolymer, it being understood that one or more branches of these block copolymer may be constituted by a random copolymer.

This type of polymerisation is generally performed in solution in the presence of a solvent and of an initiator which is a compound of an alkali metal. Moreover, during the course of polymerisation coupling agents may be added so as to couple the polymers. The copolymers thus formed most often occur in a linear or radial form, but possess a coloration which is not acceptable for the desired end uses of the copolymers.

Typical of the polymerisation processes which lead to polymers of the type suitable for treatment by the process of the present invention are those described in U.S. Pat. No. 3,639,517 and U.S. Pat. No. 4,091,053 and EP-A-0084795. Such polymerisation processes are described in summary fashion below. For more detailed descriptions of polymerisation processes suitable for use in regard to the invention, reference is made to U.S. Pat. No. 3,639,517 and U.S. Pat. No. 4,091,053 and EP-A-0084795, the entire disclosures of which are incorporated herein by reference.

The polymerisation is performed in solution at a temperature of from −100° C. to +150°, in the presence of a solvent and at a pressure sufficient to maintain the medium in the liquid phase. The solvents employed maybe paraffinic, cycloparaffinic or aromatic. Most frequency cyclohexane or a mixture of hexane and cyclohexane is used. Initially a block of non-elastomeric polymer is formed by feeding in vinyl aromatic monomer with a defined quantity of organolithium initiator to form long chains of reactive polymers having a terminal lithium atom on the chain. Then the chains or reactive polymers are contacted with conjugated diene monomers to form chains of polymers with elastomeric and non-elastomeric blocks.

Copolymers with a structure A—B (A=vinyl aromatic, B=conjugated diene) are optionally then contacted with coupling agents to form polymers having a structure A—B—C—B—A in the case of a linear structure, where C is a moiety derived from the coupling agent. It is understood that copolymers with radial or linear structure may be formed, and that the blocks may be formed of pure homopolymers or random copolymers.

Whatever the nature of copolymers obtained, depending on the various polymerisation processes, the process of the invention is suitable for decolorising the copolymers.

Examples of suitable conjugated diene monomers include those having 4–12 carbon atoms, such as 1,3-butadiene, isoprene, 2,3-dimethyl-1,3 butadiene, piperylene, 3-butyl-1, 3-octadiene and other analogues. Example of suitable vinyl aromatic monomers are styrene, alpha-methylstyrene, vinyl-naphthalene and other analogues. Since the process is applicable to resinous copolymers as well as to elastomeric copolymers, the conjugated diene/vinyl aromatic ratio by weight may vary within wide limits and particularly from 1/99 to 85/15.

The optional coupling agents are chosen from among polyvinyl aromatic compounds, polyepoxides, polyisocyanates, polyamines, polyaldehydes, polyketones, polyhalides such as silicon tetrahalide and halosilanes, polyanhydrides, polyepoxyesters and polyesters. Combinations of different kinds of coupling agents may also be used.

Examples of suitable polyvinyl aromatic compounds include divinylbenzene, 1,2,4-trivinylbenzene, 1,3-dinvinylnaphthalene, 1,3,5-trivinylnaphthalene, 2,4-divinylbiphenyl, and analogues thereof.

Polyepoxide compounds can equally be employed. In general, polymers of epoxidised hydrocarbons are used such as epoxidised liquid polybutadiene or epoxidised vegetable oils such as epoxidised soya oil and epoxidised linseed oil. Other epoxy compounds such as 1,2; 5,6; 9,10;-triepoxydecane may also be used.

Examples of suitable polyisocyanates are benzene-1,2,4-triisocyanate, naphthalene-1,2,5,7-tetraisocyanate and analogues thereof.

Examples of suitable polyamines are oxides or sulphides of triaziridinyl phosphine such as tri(1-aziridinyl) phosphine oxide, tri(2-methyl-1-aziridinyl) phosphine oxide, (2-ethyl-3-decyl-1-aziridinyl) phosphine sulphide, and analogues thereof.

1,4,7-Naphthalenetricarboxaldehyde, 1,7,9-anthracenetricarboxaldehyde, 1,1,5-pentanetricarboxaldehyde, and analogues thereof are examples of suitable polyaldehydes.

1,4,9,10-Anthracenetetranone, 2,3-diacetonylcyclohexanone, and analogues thereof are examples of suitable polyketones.

Pyromellitic dianhydride, styrene-maleic anhydride copolymers, and analogues thereof are examples of suitable polyanhydrides.

Examples of suitable polyhalides are tetrahalides of silicon such as $SiCl_4$, $SiBr_4$ and $SiI_4$, trihalosilanes, such as trifluorosilane, trichlorosilane, trichloroethylsilane, triboromobenzylsilane, and analogues thereof, and halogen-substituted hydrocarbons such as 1,3,5-tri(-bromomethyl) benzene, 2,5,6,9-tetrachloro-3,7-decadiene, and analogues thereof.

Examples of compounds having more than one functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy,3-hexanone, 1,2; 11,12-diepoxy-8-pentadecanone, 1,3; 18,19-diepoxy-1 7,14-eicosanedione, and analogues thereof.

It is also possible to use other metal halides such as those of tin, lead or germanium as well as polyalkoxides of metals such as silicon tetraethoxide. A difunctional coupling agent maybe employed when a linear polymer is desired rather than a branched polymer. In general, the total quantity of coupling agent is from 0.5–1.5 weight parts per hundred parts (pph or phr) of polymer.

According to the process of the invention, the coupled copolymer thus obtained is treated to decolorise it by making the impurities formed by the lithium compounds and other coupling agents react with the dicarboxylic acids used in accordance with the present invention.

The invention may be used in a very advantageous manner when the process for recovering the copolymer is based on direct elimination of the solvent. Part of the polymerisation solvent may be removed before subjecting the polymer to the decolorisation treatment of the invention.

The quantity of dicarboxylic acid of $C_9$ to $C_{16}$ to be employed is usually from 0.02–2.0 parts per hundred parts by weight (pph) of polymer and preferably from 0.1–0.5 pph of polymer. The acid may be added to the polymer solution singly or a mixture of dicarboxylic acids may be added to the polymer solution. The acid or acid mixture may be added directly to the polymer solution or in a solvent such as cyclohexane.

By using the dicarboxylic acids of $C_9$ to $C_{16}$ in accordance with the invention, a perfectly transparent polymer can be obtained, and in addition, the polymer acquires a certain anti-oxidant activity which allows a considerable reduction in the amount of anti-oxidant additive, usually of the phosphite type or similar anti-oxidant.

The use of the aliphatic dicarboxylic acids having $C_9$ to $C_{16}$ such as azelaic acid, sebacic acid or dodecanoic acid in accordance with the invention provides a number of advantages over and above the resistance to a decrease in transparency and to an increase in the haze when the vinyl aromatic-conjugated diene block copolymer is subjected to a high humidity environment. In particular, the use of such dicarboxylic acids provides the block copolymer with high transparency and high water barrier properties. There are processing advantages also in the use of such dicarboxylic acids, namely only one addition of the dicarboxylic acid is required to the reactor after termination of the block copolymer formation by a terminating agent such as for example propylene oxide, and low volatility of the $C_9$ to $C_{16}$ carboxylic acid if excess acid is added to the solution.

The present invention yet further preferably provides a process for producing vinyl aromatic-conjugated diene block copolymers, the process comprising solution polymerising at least one vinyl aromatic hydrocarbon and a conjugated diene in the presence of a catalyst based on an alkali metal to produce copolymer chains which end with an alkali metal and treating the copolymer chains in solution with a linear alkyl dicarboxylic acid having from 9 to 16 carbon atoms and the acid being in the form of a slurry in an organic liquid with the acid being granulated and having an average granule size of less than 50 microns. The copolymer may have some level of transparency resulting from a styrene content of from 15 to 95 wt %. Preferably, the vinyl-aromatic-conjugated diene block copolymer is transparent, haze-free and colourless and comprises a styrene-butadiene-styrene block copolymer having at least 70 wt % styrene content.

In accordance with this further aspect of the invention, the dicarboxylic acid decolorising agent is added to the block copolymer in solution as a slurry. Preferably, the slurry comprises finely ground particles of the dicarboxylic acid, preferably having an average particle size of from 5 to 50 microns, in an organic liquid, such as an alkane, for example hexane. A particularly preferred organic liquid comprises hexane as a mixture of cyclohexane and n-hexane in a ratio of 85 wt % cyclohexane/15 wt % n-hexane. In such a hexane mixture, azelaic, sebacic and dodecanoic acids have a concentration, determined at room temperature of 0.34, less than 0.002, and 0.015 wt % respectively.

The present inventors have found that the use of a slurry of finely ground dicarboxylic acid in an organic liquid significantly accelerates the neutralisation of the alkaline lithium derivatives. U.S. Pat. No. 4,403,074 and EP-A-0084795 disclose that the aliphatic dicarboxylic acid can be added in the neutralisation step as an aqueous solution or dispersion, or can be admixed with a dry solvent, preferably cyclohexane, when added to the polymer cement or concentrated polymer cement. However, the present inventors have discovered surprisingly that in order to incorporate such diacids via industrially feasible economical techniques, the diacid must be incorporated as a slurry of the finely ground particles in an organic liquid with the particles having an average particle size of less than 50 microns. This provides the advantage of significantly reducing the neutralisation time and ensuring that the polymer when recovered has the required optical and mechanical properties. If the average particle size is less than 5 microns, then health and safety problems may be encountered in an industrial environment, particularly with regard to the hazard of inhalation of the particles.

Preferably, the diacid granules are comminuted, for example by micronising in known manner, so as to have an average particle diameter of less than 50 microns, most preferably less than 25 microns, and still more preferably less than 10 microns. The use of sebacic acid granules down to an average particle size of 23 microns, for example, reduces the neutralisation time to 10 minutes as compared to neutralisation times of up to around 6 hours for "as received" industrially available sebacic acid granules having an average granule size of around 138 microns. When the sebacic acid granules are comminuted in size to down to around 8 to 10 microns average size, the neutralisation time may be reduced yet further to around 1 minute.

The following examples are given to illustrate the present invention more clearly but without in any way limiting its scope.

EXAMPLES 1 TO 3

In these Examples, an SBS block copolymer was produced (in amounts of around 12kg) using n-butyl lithium as a catalyst. The alkaline lithium derivatives were neutralised with a $C_9$ or $C_{10}$ dicarboxylic acid in accordance with the invention with an excess amount of 5 mol % based on the total amount of n-butyl lithium catalyst. The diacids were injected as a solution in tetrahydrofuran (THF). For Example 1 the diacid comprised azelaic acid at a concentration of 80% and in an amount of 0.117 phr (i.e. per 100 parts of the copolymer). For Example 2, the diacid comprised azelaic acid at a concentration of 98% and in an amount of 0.120 phr. For Example 3, the dicarboxylic acid comprised sebacic acid in an amount of 0.126 phr. The resultant rubbery copolymers when recovered were desolventised and then 2 mm thick compression moulded plaques were formed therefrom. The optical properties, in particular the haze, the transmission and the yellowness index, of the plaques were determined for each of Examples 1 to 3 and the results are shown in Table 1. It may be seen from Table 1 that use of the $C_9$+dicarboxylic acids in accordance with the invention provides a haze of 2% or less and a transmissibility of more than about 90%. The haze and transparency were measured in accordance with the procedures of ASTM D1003-97. The yellowness index was measured in accordance with the procedures of ASTM D1925-70 (Reapproved 1977).

The SBS block copolymers produced in accordance with Example 1 and Example 3 were formed into 1 mm thick compression moulded plaques and then those plaques were immersed in water at a temperature of 30° C. for a period of up to 8 days. The water take up, measured in ppm, of the plaques as a function of the immersion time was measured and the results are shown in FIG. 1. It may be seen for Example 1 that after an immersion time of 7 days the water take up was very low, being about 1250 ppm, whereas for Example 3 the water take up was even lower, being around 500 ppm after an immersion time of 8 days.

Figure 2:
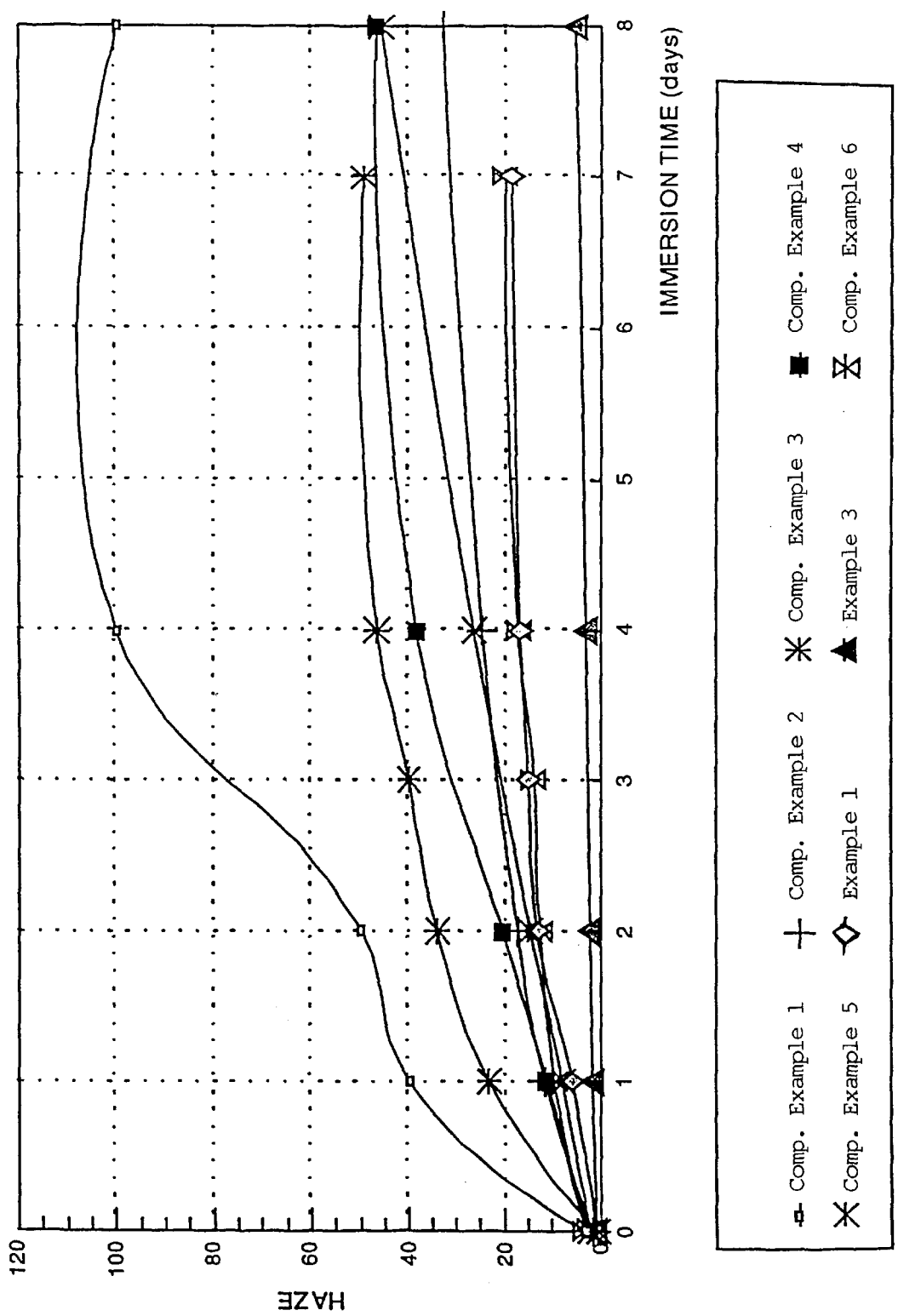
FIG. 2 shows the relationship between haze and immersion time for the sheets of those Examples and Comparative Examples.

The haze of the plaques which were subjected to the water immersion was also determined as a function of the immersion time for Examples 1 and 3 and the results are shown in FIG. 2. It may be seen from FIGS. 1 and 2 that the haze generally increased over time, and generally in correspondence with the water take up of the rubber plaques. After an immersion time of 7 days the plaque employed for Example 1 had a haze of around 20% whereas for Example 3 after an immersion time of 8 days the plaque had a haze of around 5%.

Comparative Examples 1 To 5

In Comparative Examples 1 to 5, Examples 1 to 3 were repeated but using propionic acid (a monoacid) and $C_4$ to $C_8$ dicarboxylic acids. Thus for Comparative Examples 1 to 5, the mono- or dicarboxylic acids employed were, respectively, propionic acid, glutaric acid, adipic acid, pimelic acid and suberic acid, and were employed in the amounts specified in Table 1. For Comparative Example 1, the propionic acid was added as a solution in hexane whereas for Comparative Examples 2 to 5 the diacids were, as for Examples 1 to 3, solutions in THF. Again, the optical properties of plaques produced from the resultant SBS block copolymers were determined and the results are shown in Table 1.

It may be seen from Table 1 that the use of some dicarboxylic acids of less than $C_9$, for example glutaric acid, adipic acid and suberic acid, provided optical properties of the SBS block copolymers similar to those obtained in accordance with Examples 1 to 3. However, these optical properties are the initial optical properties, and in accordance with the invention the inventors have discovered that when SBS block copolymers produced in accordance with the Comparative Examples are subjected to a high humidity environment, for example by being immersed in water, those copolymers of the Comparative Examples exhibit significant water take up, resulting in a significant increase in the haze of the copolymers.

The elastomers produced in accordance with Comparative Examples 1 to 5 were also subjected to the water immersion tests described above with reference to Examples 1 to 3 and the water take up and increase in haze of the rubbers as a function of immersion time was also measured for Comparative Examples 1 to 5. The results are also shown in FIGS. 1 and 2.

It may be seen from FIGS. 1 and 2 that the use of $C_9$+dicarboxylic acids as neutralising and decolorising agents in accordance with the invention unexpectedly provides a significant reduction of water take up, and a corresponding significant reduction in an increase in haze, of the copolymer rubbers as a function of the period to which the rubbers are subjected to a high humidity environment. This phenomenon could not have been predicted from the prior art. Thus when the samples of the polymers having being neutralised with a dicarboxylic acid are subjected to a high humidity environment, for example by being immersed in water at 30° C., the chain length of the carboxylic diacid determines the rate of water absorption as a function of time, thereby determining the increase in haze of the rubber. It may be seen from the best result of those Comparative Examples, i.e. glutaric acid, that after a period of 8 days, the haze was more than 30%, significantly higher than for Examples 1 and 3.

Comparative Example 6

In this Comparative Example, a 1 mm thick compression moulded plaque of a commercially available SBS block copolymer sold by Phillips Petroleum of Bartlesville, Okla., USA under the trade designation KR04 was subjected to the water immersion test of Comparative Examples 1 to 5 and the results are also shown in FIGS. 1 and 2. It may be seen that the increase in haze with time for the rubber of Comparative Example 6 was slightly higher than for Example 1. The rubber of Comparative Example 6 had the initial optical properties of haze, transmissivity and yellowness index as specified in Table 1. It is believed that the copolymer was neutralised with carbon dioxide.

EXAMPLE 4

In this Example, sebacic acid was employed on an industry scale to produce an SBS block copolymer in an amount of 3.5 tons. The sebacic acid was added to the SBS block copolymer solution as a slurry comprising sebacic acid granules having an average particle size of from 8 to 10 microns, in an amount of 20 wt % in a $C_6$ alkane. The resultant SBS block copolymer was pelletised and then treated for 10 minutes on a roll mill at a temperature of 130° C. to produce crepes, from which 2 mm thick compression moulded plaques were prepared. The optical properties of the compression moulded plaques were determined and the haze, transmittance and yellowness index are specified in Table 2.

Comparative Example 7

In this Comparative Example, the process parameters of Example 4 were repeated by employing propionic acid in solution in a $C_6$ alkane instead of sebacic acid as a slurry. The corresponding optical properties of 2 mm thick compression moulded plaques are shown in Table 2.

It may be seen that by employing sebacic acid as opposed to propionic acid as a decolorising neutralising agent, improved optical properties, as represented by decreased haze, increased transmittance and a lower yellowness index, may be achieved.

Comparative Example 8

In this Comparative Example, a commercially available SBS block copolymer from Phillips Petroleum of Bartlesville, Okla., USA and sold under the trade designation KR05 was formed into 2 mm thick compression moulded plaques and the optical properties of those plaques were determined, with the results being specified also in Table 2. It is believed that the copolymer was neutralised with carbon dioxide. It may be seen that the SBS block copolymer produced in accordance with Example 4 has a lower haze and a slightly improved transmittance and yellowness index as compared to the commercially available SBS block copolymer of Comparative Example 8.

Figure 3:
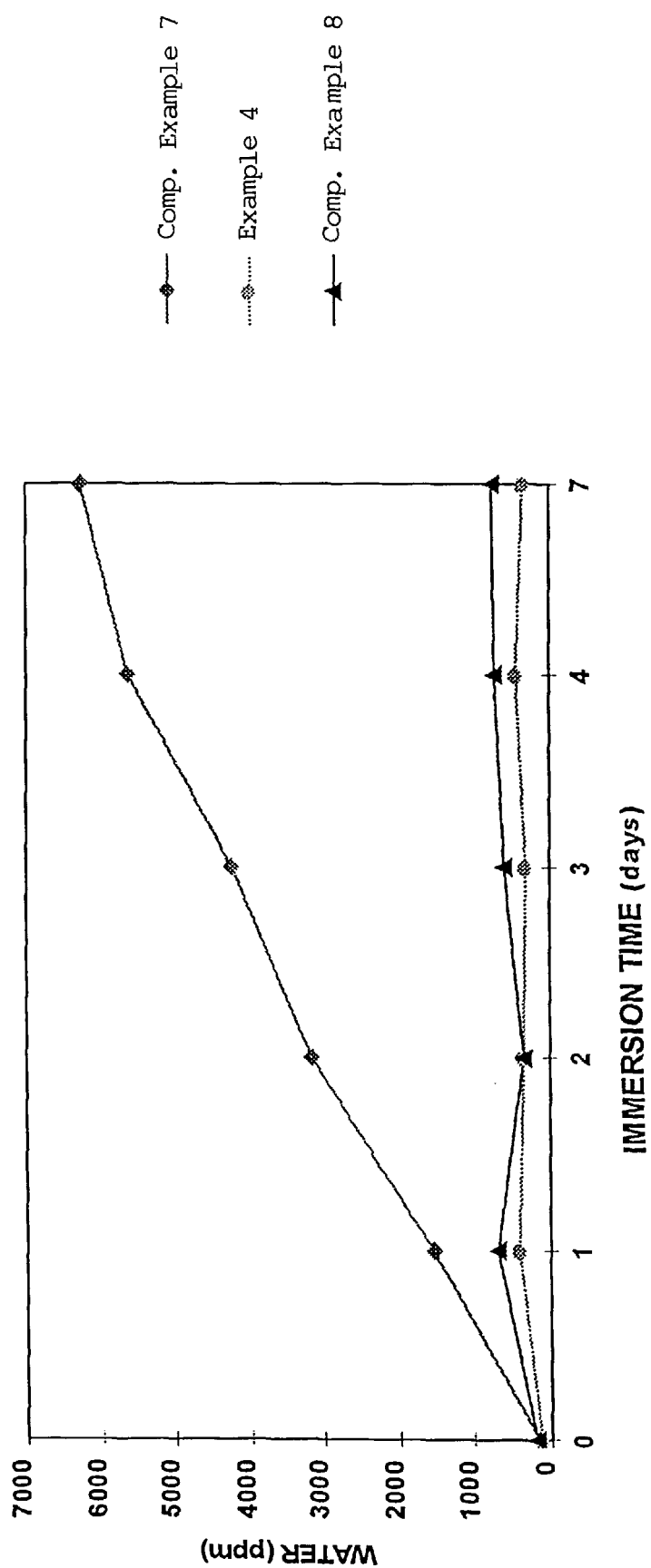
FIG. 3 shows the relationship between water take up and immersion time for sheets of SBS copolymer in accordance with a further Example of the invention and further Comparative Examples.
Figure 4:
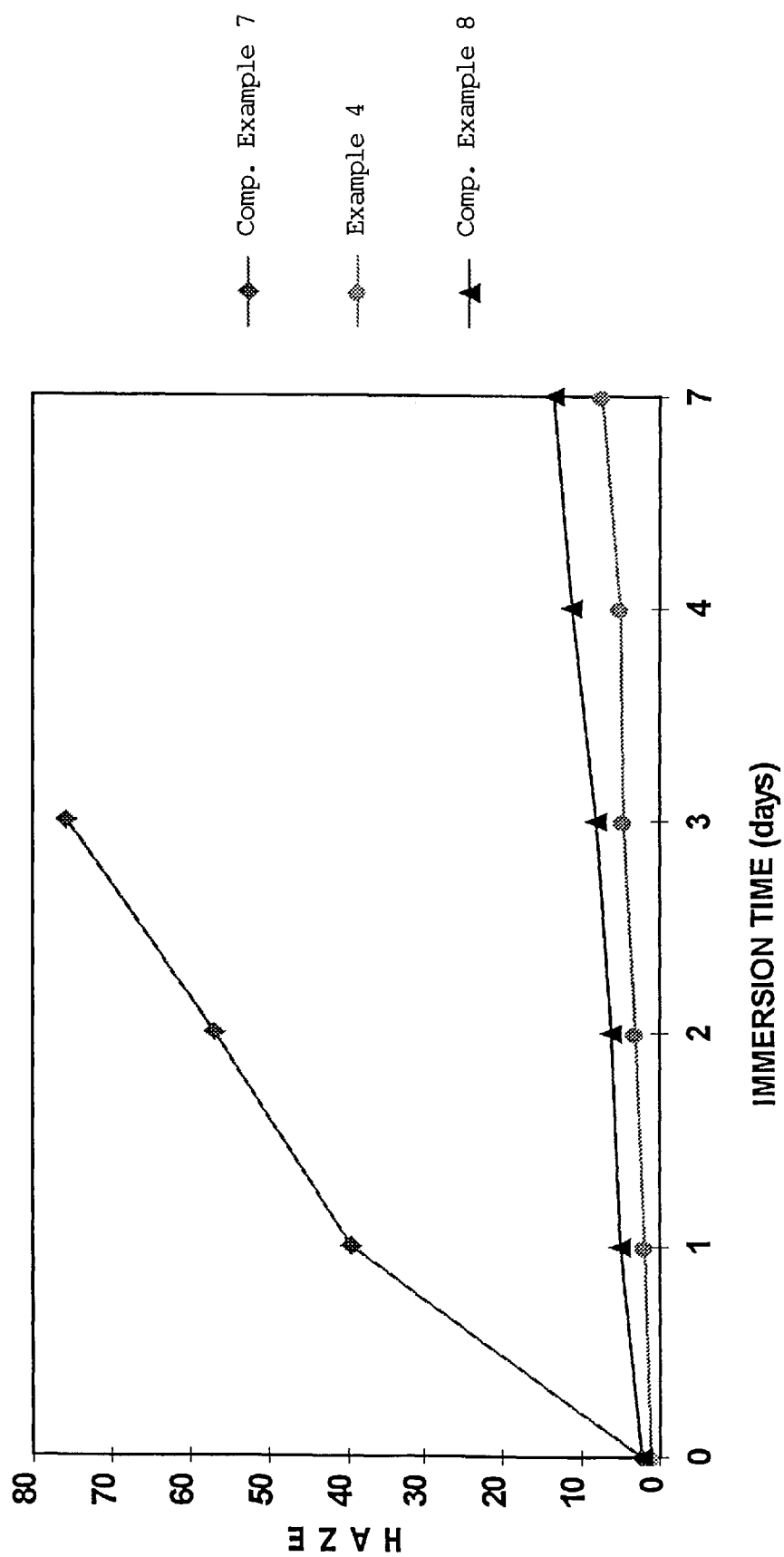
FIG. 4 shows the relationship between haze and immersion time for the sheets of that further Examples and those further Comparative Examples.

The SBS block copolymers of Example 4 and Comparative Examples 7 and 8 were formed into 1 mm thick compression moulded plaques and were immersed in deionised water at a temperature of 30° C. for a period of up to 7 days. The relationship between the water take up and the haze with the immersion time was determined and the results are shown in FIGS. 3 and 4. It may be seen that for the SBS block copolymer produced using sebacic acid in accordance with Example 4, both the water take up and the haze over time were significantly reduced as compared to the use of propionic acid for Comparative Example 7. Moreover, the polymer of Example 4 produced using sebacic acid had reduced water take up and reduce increase in haze over time as compared to the commercially available polymer of Comparative Example 8.

Thus even under the severe test represented by immersion of the polymer in water at 30° C. over a number of days, the use of a $C_9$+dicarboxylic acid generates a very low tendency to absorb water with a corresponding low rate of haze increase, corresponding to the rate of loss of transparency.

EXAMPLES 5 TO 7

Figure 5:
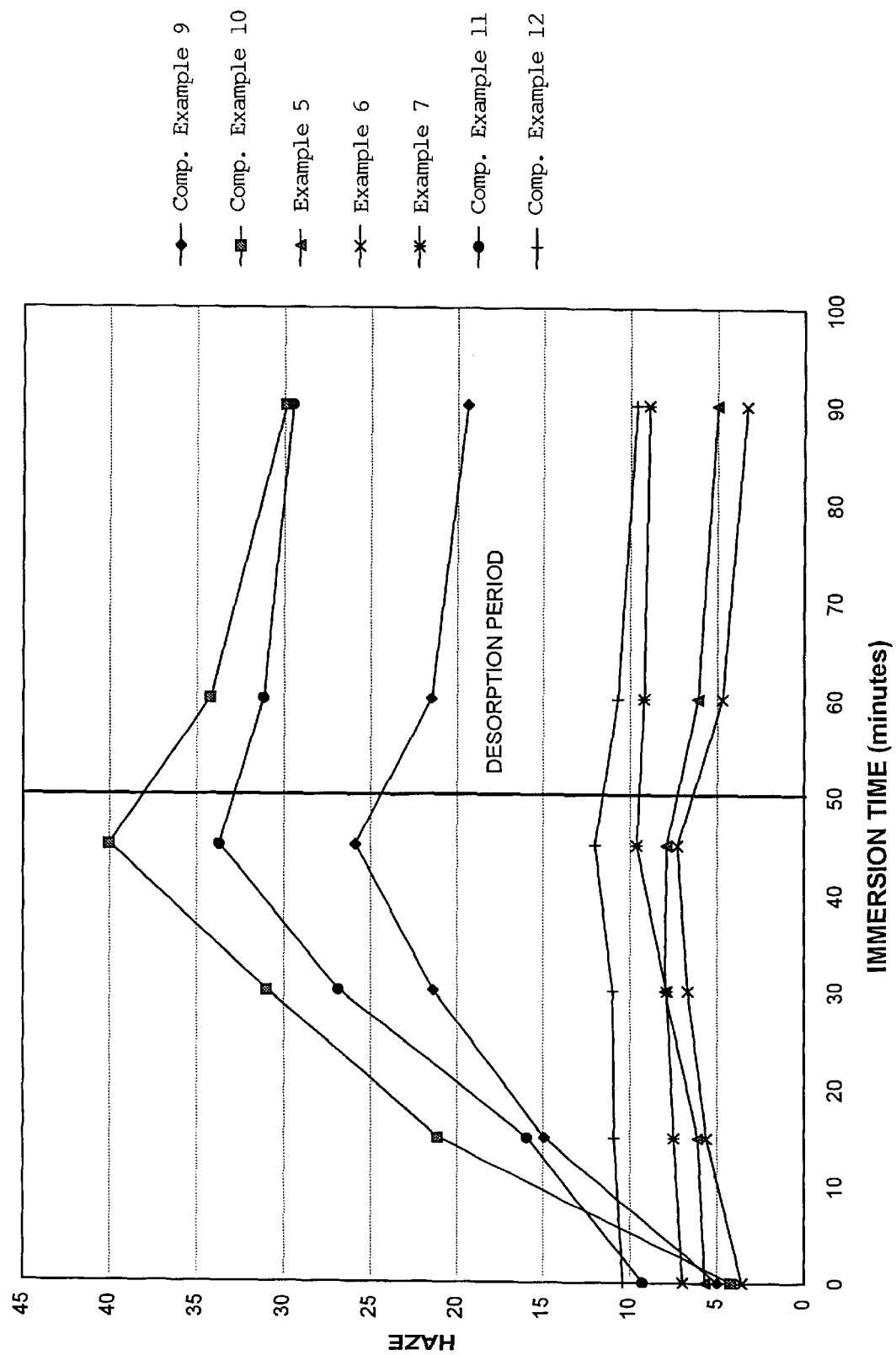
FIG. 5 shows the relationship between haze and immersion time, with a subsequent desorption period, for sheets of SBS copolymer produced in accordance with yet further Examples of the invention and further Comparative Examples.

In these Examples, an SBS block copolymer was neutralised with sebacic acid in accordance with the present invention and was then blended with general purpose polystyrene (PS) (referred to hereinabove) in varying weight ratios and the blends were then formed into extruded sheets 400 or 800 microns thick. The resulting sheets were then subjected to immersion in water at a temperature of 65° C. and the increase in haze as a function of the immersion time was measured. The results are shown in FIG. 5. For Example 5 the blend comprised a 40 wt % SBS/60 wt % PS blend formed as a 400 micron thick extruded sheet. For Example 6 the blend comprised a 60 wt % SBS/40 wt % PS blend formed as a 400 micron thick extruded sheet. For Example 7 the blend comprised a 50 wt % SBS/50 wt % PS blend formed as an 800 micron thick extruded sheet. The immersion time was 50 minutes and thereafter the sheets were removed from the water and subjected to a desorption period of 40 minutes over which period the haze of the blends was measured after 10 minutes and 40 minutes desorption, (i.e. total times of 60 minutes and 90 minutes including the immersion time). The results are again shown in FIG. 5.

It may be seen from FIG. 5 that for each of Examples 5 to 7 the increase in haze over the immersion time is not particularly high, yielding a final haze of less than 10% at the end of the immersion time of 50 minutes. The haze is reduced in the desorption period.

Comparative Examples 9 To 11

For Comparative Examples 9 to 11, blends of SBS block copolymer and general purpose polystyrene (PS) were produced using propionic acid for decolorising and neutralising the SBS block copolymers as opposed to sebacic acid. For Comparative Examples 9 to 11 respectively the weight ratios of the blends and the sheet thicknesses corresponded respectively to those for Examples 5 to 7. The sheets of Comparative Examples 9 to 11 were subjected to the same water immersion tests as Examples 5 to 7 and the results are also shown in FIG. 5.

From FIG. 5, it may be seen that under severe humidity testing conditions, such as immersion in water at 65° C., the extruded sheets of the SBS copolymer/polystyrene blends having being produced by neutralisation of the SBS copolymer using sebacic acid, there is a very low tendency for the haze to increase as compared to the use of propionic acid as neutralising agent. Furthermore, following water immersion, the use of propionic acid leads to a retarded desorption period as a result of the high concentration of absorbed water. In other words, when propionic acid is used as the neutralising agent, in accordance with the Comparative Examples, at the end of the desorption period the haze is still very high compared to that for the Examples of the invention.

Comparative Example 12

In this Comparative Example, a commercially available SBS block copolymer from the company Phillips Petroleum Company of Bartlesville, Okla., United States of America under the trade designation KK38 having a haze of 3.2%, a transmissivity of 90.6% and a yellowness index of 3.4 was blended with general purpose polystyrene to form a 50 wt % SBS block copolymer/50 wt % PS blend. It is believed that the commercial block copolymer was neutralised with carbon dioxide. The blend was then extruded to form an 800 micron thick sheet. The resultant sheet was then subjected to the same water immersion test as for Examples 5 to 7 and Comparative Examples 9 to 11 and the results are shown in FIG. 5. It may be seen that the blend of Comparative Example 12 using a commercially available SBS block copolymer had increased haze during immersion and following the desorption period as compared to the blends incorporating SBS block copolymer neutralised in accordance with the process of the invention.

EXAMPLES 8 TO 12

In these Examples, the effect of the size of the granules of the $C_9$+dicarboxylic acid, in particular sebacic acid, on the neutralisation time was investigated. In these Examples, sebacic acid granules having the properties specified in Table 3 were added in an amount of 0.132 phr as a 20 wt % slurry in a solvent comprising 85 wt % cyclohexane/15 wt % n-hexane to a reactor vessel containing copolymer solution following deactivation of the copolymerisation by propylene oxide. The pH values of the polymer solution was measured over time, following incorporation of an antioxidant system into the polymer solution. The pH values were determined using the Merck Universal Indicator No. 9175. The results are specified in Table 3. Following neutralisation of the polymer solution to have a pH of 6, the colour and appearance of the polymer solution were visually examined and the results are shown also in Table 3.

It may be seen from Table 3 that the addition of sebacic acid granules as received from industrial sebacic acid sources, i.e. the granules having an average particle size of 138 microns, as a slurry in a $C_6$ solvent required at least 6 hours to reach a pH value close to 6 indicative of the achievement of neutralisation (which requires pH values of less than or equal to 7). If the polymer is recovered after only 1.5 hours, the yellow hazy polymer solution generates after solvent removal a strongly coloured, poorly processible polymer since the pH of the polymer solution after 1.5 hours is around 9, so that the solution has not been neutralised. If the neutralisation is continued for a total of 6 hours, after 6 hours a colourless transparent polymer solution is recovered, since the neutralisation has been achieved to yield a pH of 6, but the neutralisation time is unacceptably long.

For the remaining Examples 9 to 12 it may be seen that reducing the size of the sebacic acid granules down to average values of 23 microns, 8.3 microns and 10 microns respectively yields increasingly fast neutralisation times which are industrially attractive.

EXAMPLES 13 TO 15

Figure 6:
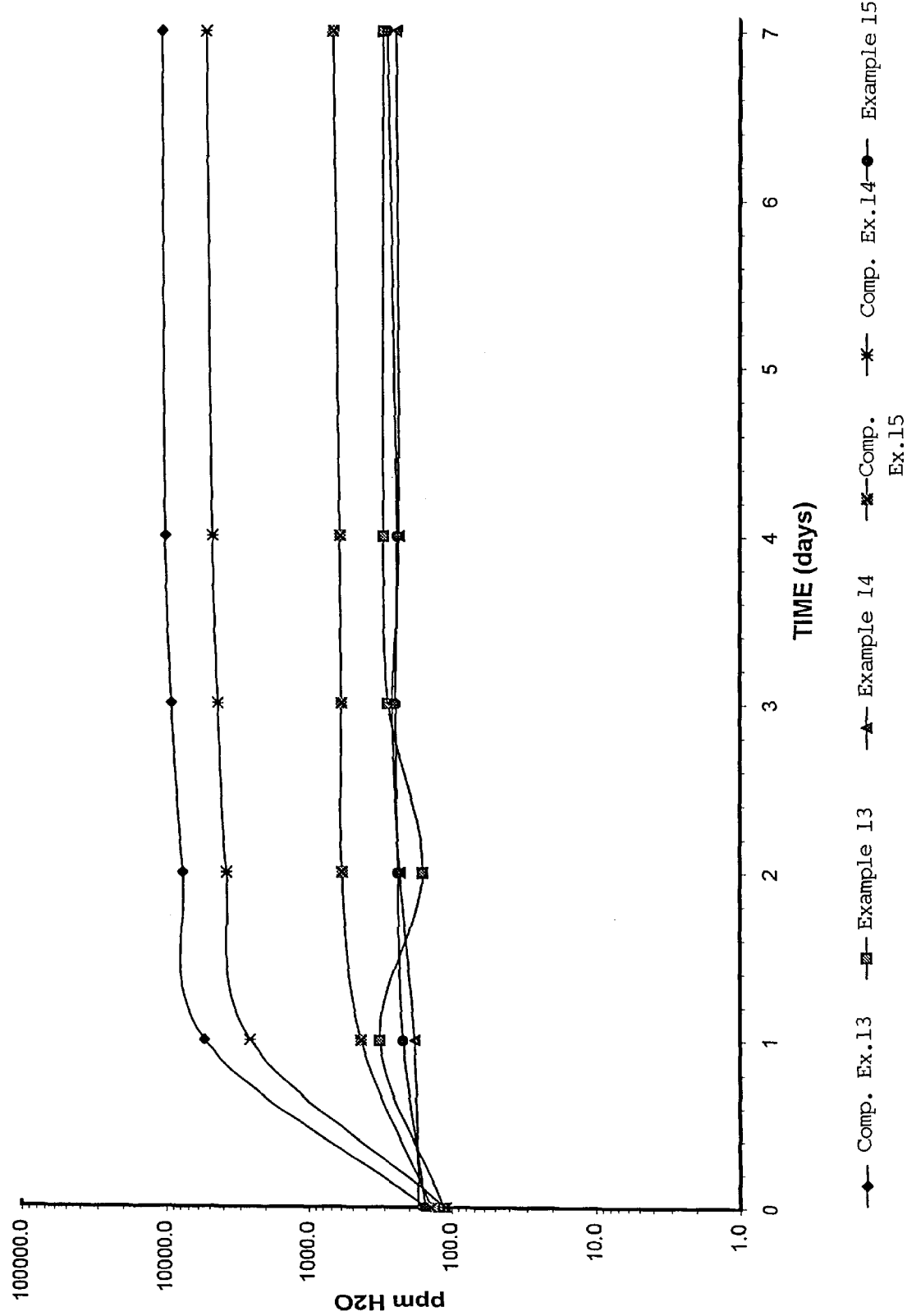
FIG. 6 shows the relationship between water take up and immersion time for SBS copolymer sheets produced in accordance with Examples of the invention and Comparative Examples.

In these Examples, for Example 13 sebacic acid and for Examples 14 and 15 dodecanoic acid were employed to neutralise alkaline lithium derivatives of an SBS block copolymer. Following the production of sheets of polymer as described with reference to Examples 1 to 3, the variation in water take up (in ppm $H_2O$) with time (in days) was measured for a total of 7 days, and the results are shown in FIG. 6. It may be seen that for the block copolymers neutralised with sebacic acid in accordance with Example 13 and with dodecanoic acid in accordance with Examples 14 and 15 had a low water take up even after a period of 7 days, with the water take up after 7 days being respectively 304, 247 and 285 ppm $H_2O$ for Examples 13 to 15.

Figure 7:
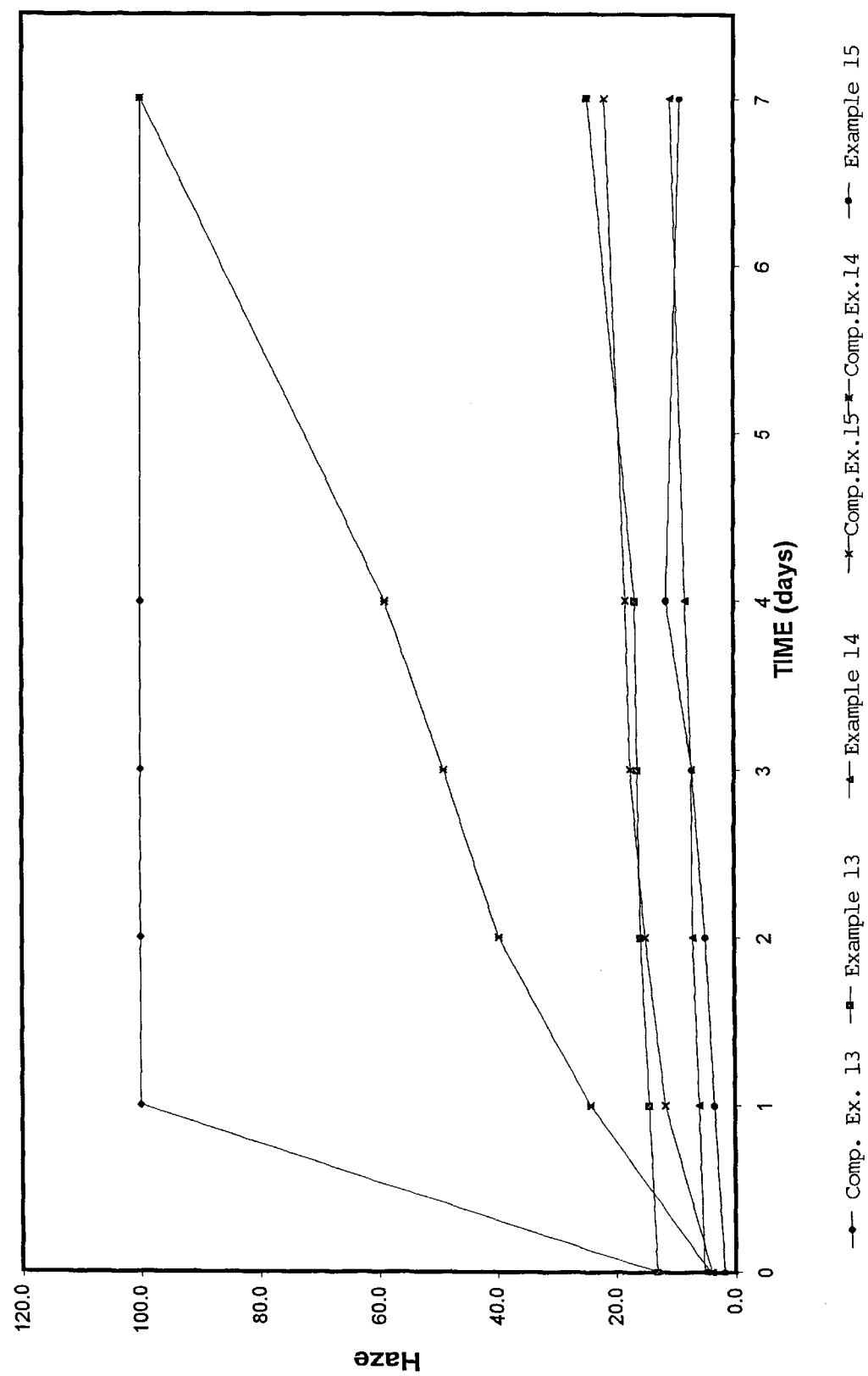
FIG. 7 shows the relationship between haze and immersion time for the sheets of those Examples and Comparative Examples.

The corresponding increase in haze of the sheets for each of those Examples was also measured and the results are shown in FIG. 7. It may be seen that the maximum increase in haze was for Example 13, yielding a haze of around 25% after a period of 7 days.

Comparative Examples 13 To 15

In these Comparative Examples, sheets corresponding to those of Examples 13 and 14 were prepared using propionic acid for Comparative Examples 13 and 14 whereas for Comparative Example 15 the SBS block copolymer comprised a commercially available SBS block copolymer sold by Phillips Petroleum of Bartlesville, Okla., USA under the trade designation XK40. The SBS block copolymers of these Comparative Examples were subjected to the same water immersion test as for Examples 13 to 15 and the results with respective water take up and haze are also shown in FIGS. 6 and 7. It may be seen that for each of the Comparative Examples employing propionic acid as a neutralising agent, the water take up and haze were greatly increased over the immersion period as compared to the use of sebacic acid or dodecanoic acid. For the commercially available SBS block copolymer XK40, the water take up was greater for this Comparative Example than for Examples 13 to 15, but the haze at the end of the 7 day immersion period was around 22%, slightly lower than that for Example 13, but higher than that for Examples 14 and 15 which respectively had haze values of around 11% and 9% after the 7 day immersion period.

EXAMPLE 16

Figure 8:
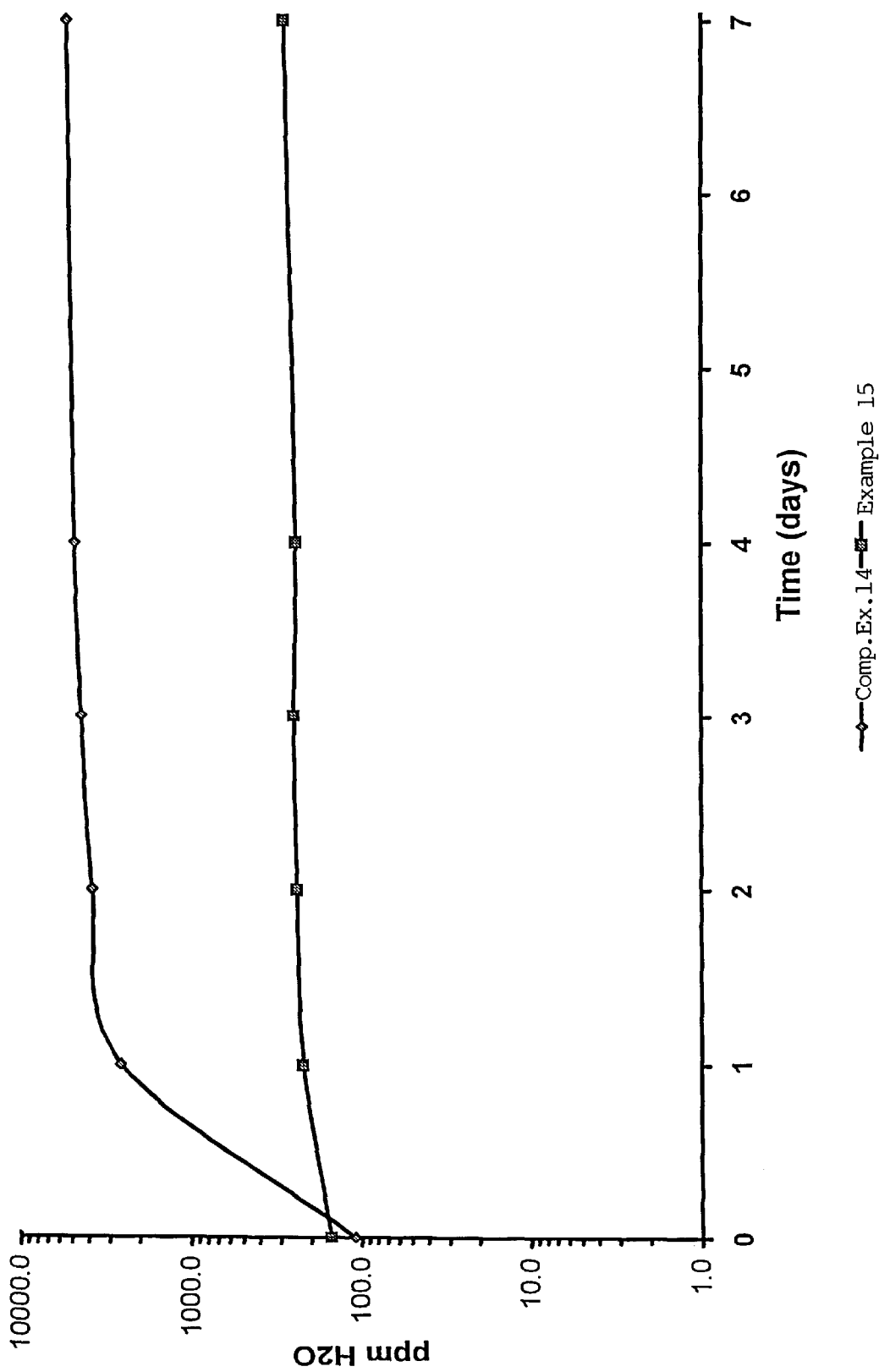
FIG. 8 shows the relationship between water take up and immersion time for sheets of SBS copolymer in accordance with a further Example of the invention and a further Comparative Example.
Figure 9:
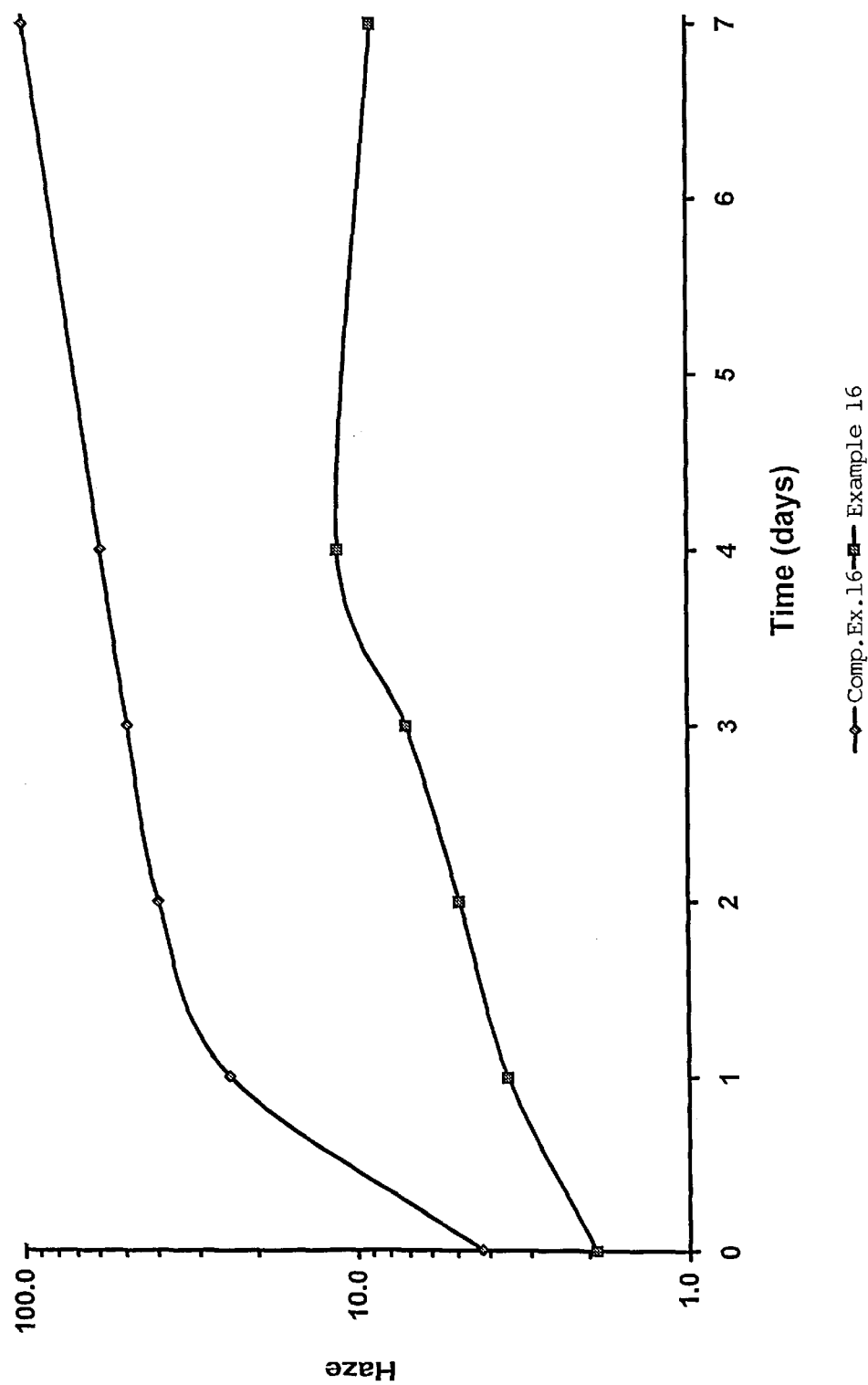
FIG. 9 shows the relationship between haze and immersion time for the sheets of that further Example and Comparative Example.

In this Example, dodecanoic acid was used as a neutralising agent for an SBS block copolymer which was then formed into a sheet and was immersion tested for water take up and haze increase over time as for Examples 1 to 3. The results are shown in FIGS. 8 and 9. It may be seen from those Figures that water take up and increase in haze over time for the 7 day immersion period were low.

Comparative Example 16

In this Comparative Example, the same SBS block copolymer as for Example 16 was neutralised with propionic acid and then the SBS block copolymer was formed into sheets as for Example 16 which were subjected to the same 7 day immersion test in water. The results with respect to water take up and haze are shown in FIGS. 8 and 9. It may be seen from FIGS. 8 and 9 that when employing dodecanoic acid as opposed to propionic acid as a neutralising agent, there is a significantly reduced take up in water and increase in haze when the SBS block copolymer is subsequently subjected to a humid environment.

TABLE 1

| | ACID TYPE (phr) | C number (acid functions) | HAZE % | TRANSMISSIVITY % | YELLOWNESS INDEX |
|---|---|---|---|---|---|
| Example 1 | AZELAIC 80% (0.117) | C9 (di) | 2.0 | 90.7 | 0.63 |
| Example 2 | AZELAIC 98% (0.120) | C9 (di) | 0.8 | 91.0 | 1.66 |
| Example 3 | SEBACIC (0.126) | C10 (di) | 0.9 | 91.4 | −0.09 |
| Comparative Example 1 | PROPIONIC (0.91) | C3 (mono) | 5.6 | 84.4 | 14.1 |
| Comparative Example 2 | GLUTARIC (0.083) | C5 (di) | 2.0 | 90.6 | 1.41 |
| Comparative Example 3 | ADIPIC (0.091) | C6 (di) | 1.0 | 91.0 | 0.70 |
| Comparative Example 4 | PIMELIC (0.100) | C7 (di) | 4.8 | 90.0 | 1.93 |
| Comparative Example 5 | SUBERIC (0.109) | C8 (di) | 1.8 | 91.2 | 1.02 |
| Comparative Example 6 | | | 1.1 | 91.2 | 1.5 |

TABLE 2

| | HAZE % | TRANSMITTANCE % | YELLOWNESS INDEX |
|---|---|---|---|
| Example 4 | 1.2 | 91 | 1.79 |
| Comparative Example 7 | 4 | 87.8 | 5.13 |
| Comparative Example 8 | 3 | 90.4 | 1.84 |

TABLE 3

| | SEBACIC ACID PARTICLE SIZE | INCORPORATION TEMPERATURE (° C.) | pH VALUES AT THE INDICATED TIME | | | | | | | POLYMER SOLUTION | |
|---|---|---|---|---|---|---|---|---|---|---|---|
| | | | MINUTES | | | | | HOURS | | | |
| | | | 1 | 2.5 | 5 | 10 | 15 | 1.5 | 6 | COLOUR | APPEARANCE |
| EXAMPLE 8 | 50% < 113μ, 90% < 293μ (average: 138μ) | 60 | | | | | | 9 | 6 | COLOURLESS | TRANSPARENT |
| EXAMPLE 9 | 50% < 14μ, 90% < 52μ(average: 23μ) | 65 | 9 | 8 | 7 | 6.5 | 6 | | | COLOURLESS | TRANSPARENT |
| EXAMPLE 10 | 50% < 7μ, 90% < 13.5μ(average: 8.3μ) | 65 | 6.5 | 6 | 6 | 6 | 6 | | | COLOURLESS | TRANSPARENT |
| EXAMPLE 11 | 50% < 9μ, 90% < 17μ(average: 10μ) | 65 | 6 | 6 | 6 | 6 | 6 | | | COLOURLESS | TRANSPARENT |
| EXAMPLE 12 | 50% < 7μ, 90% < 13.5μ(average: 8.3μ) | 50 | 6 | 6 | 6 | 6 | 6 | | | COLOURLESS | TRANSPARENT |

What is claimed is:

1. A process for reducing the water take up of a vinyl aromatic-conjugated diene polymer when subjected to a humid environment, the process comprising solution polymerising at least one vinyl aromatic hydrocarbon and a conjugated diene in the presence of a catalyst based on an alkali metal to produce alkali metal derivatives of a vinyl aromatic-conjugated diene polymer and neutralising the derivatives with a $C_9$–$C_{16}$ alkyl dicarboxylic acid.

2. A process according to claim 1 wherein the alkyl dicarboxylic acid comprises at least one of a $C_9$ to $C_{12}$ dicarboxylic acid.

3. A process according to claim 2 wherein the dicarboxylic acid comprises at least one of azelaic acid, sebacic acid and dodecanoic acid.

4. A process according to claim 1 wherein the alkyl dicarboxylic acid is added as a slurry of acid particles in an organic liquid.

5. A process according to claim 4 wherein the acid particles have an average particle size of less than 50 microns.

6. A process according to claim 4 wherein the organic liquid comprises hexane.

7. A process according to claim 1 wherein the dicarboxylic acid is added in an amount of from 0.11 to 0.13 phr.

8. A process according to claim 1 wherein the vinyl aromatic-conjugated diene polymer comprises a styrene-butadiene-styrene block copolymer.

9. A process according to claim 8 wherein the styrene-butadiene-styrene block copolymer is transparent and includes at least 70 wt % styrene units.

10. A process according to claim 1 wherein the vinyl aromatic-conjugated diene polymer includes from 15 to 95 wt % styrene as the vinyl aromatic component and a degradation in transparency and in a haze-free property of the polymer when the polymer is subjected to a humid environment is reduced.

11. A process for producing a vinyl aromatic-conjugated diene block copolymer, the process comprising solution polymerising at least one vinyl aromatic hydrocarbon and a conjugated diene in the presence of a catalyst based on an alkali metal to produce copolymer chains and treating the copolymer chains in solution with an alkyl dicarboxylic acid, whereby for enhancing the resistance of the copolymers to degradation in transparency and haze in a humid environment, the dicarboxylic acid has from 9 to 16 carbon atoms.

12. A process according to claim 11 wherein the alkyl dicarboxylic acid comprises at least one of a $C_9$ to $C_{12}$ dicarboxylic acid.

13. A process according to claim 12 wherein the dicarboxylic acid comprises at least one of azelaic acid, sebacic acid and dodecanoic acid.

14. A process according to claim 11 wherein the alkyl dicarboxylic acid is added as a slurry of acid particles in an organic liquid.

15. A process according to claim 14 wherein the acid particles have an average particle size of less than 50 microns.

16. A process according to claim 14 wherein the organic liquid comprises hexane.

17. A process according to claim 11 wherein the dicarboxylic acid is added in an amount of from 0.1 to 0.13 phr.

18. A process according to claim 11 wherein the copolymer includes from 15 to 95 wt % styrene as the vinyl aromatic component.

19. A process according to claim 11 wherein the vinyl aromatic-conjugated diene polymer comprises a styrene-butadiene-styrene block copolymer having at least 70 wt % styrene.

* * * * *